No. 78,509.  G. T. BELBIN.  
OYSTER DREDGE.  
PATENTED JUNE 2, 1868.
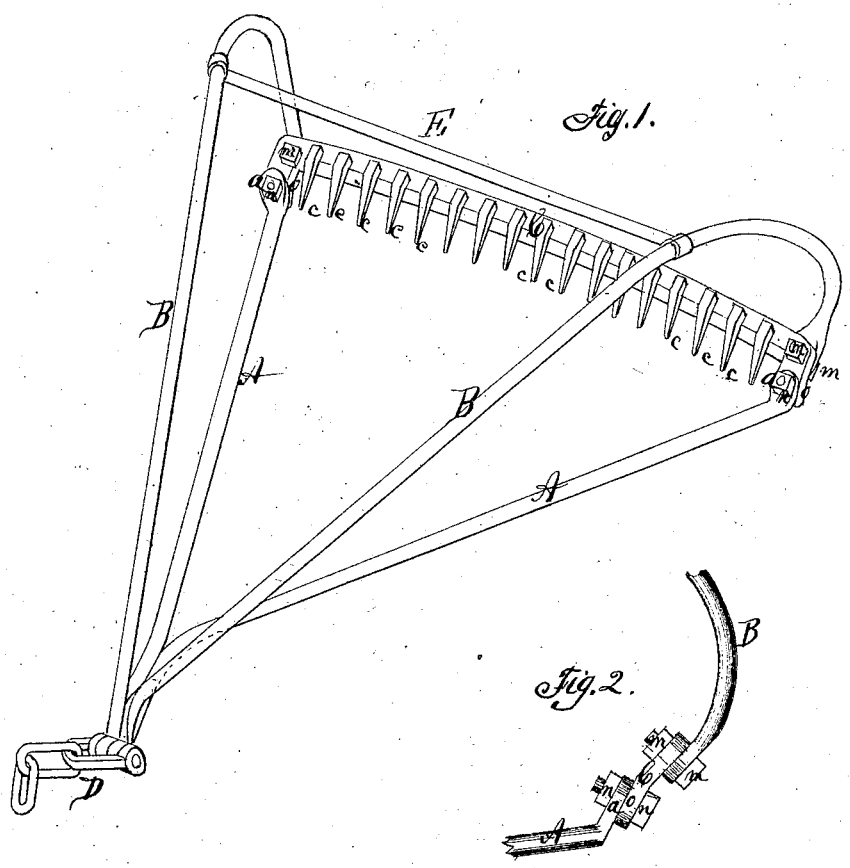

United States Patent Office.

C. T. BELBIN, OF BALTIMORE, MARYLAND.

Letters Patent No. 78,509, dated June 2, 1868.

---

IMPROVEMENT IN OYSTER-DREDGES.

---

*The Schedule referred to in these Letters Patent and making part of the same.*

---

TO ALL WHOM IT MAY CONCERN:

Be it known that I, C. T. BELBIN, of the city and county of Baltimore, and State of Maryland, have invented a new and improved Oyster-Dredge; and I do hereby declare that the following is a full, clear, and exact description of the construction and operation of the same, reference being had to the annexed drawings, making a part of this specification, in which—

Figure 1 is a perspective view.

Figure 2 is a detached view of end of the rake-head, showing the method of connecting the draught-rods to the head.

This invention relates to the old-fashioned oyster-dredge, and consists in a new method of attaching the lower draught-rods to the head, whereby the instrument is made to operate to better advantage, while its cost of construction is much less.

In the drawings, A A represent the two lower, and B B the two upper draught-rods, and D is the link that connects them at their forward end, where the rope is attached by which the instrument is operated. E is a brace, connecting and supporting the two upper draught-rods, and C is the rake-head, provided with teeth $c\,c\,c$. All these parts are to be found in the old form of the dredge, operating in general in the same manner. My improvement relates solely to devices which I will now describe and explain.

It will be observed that the upper draught-rod bends over the rake-head, and is bolted to the rear side of the latter, near its upper edge, by a bolt and nut, $m$, in the manner shown in fig. 2. In the dredges hitherto in use, the lower draught-rods are attached to the head by the same bolt $m$. This brings the lower rods at the upper edge of the rake-head, leaving the teeth $c\,c\,c$ projecting below them, in such a manner that when the instrument is being brought over the roller, on the gunwale of the vessel, the teeth catch the roller and prevent the dredge being hauled on board the vessel. Many expedients have been resorted to in order to obviate this difficulty, but all of them have to a greater or less extent complicated the instrument, and produced other inconveniences in the place of the one they were intended to remedy, besides adding to the cost of the whole apparatus. I completely obviate all difficulties, however, by welding a lug, $o$, on the end of the rake-head, extending down in the same direction as the teeth, and bolting the lower draught-rod to the lower end of the lug, through a bent-up ear, $a$, on the end of the rod, as shown clearly in fig. 2, using a bolt and nut, $n$, for the purpose, similar to that shown at $m$. When the instrument is brought over the roller on the gunwale of the vessel, its whole weight rests on the lower rods A A, which prevent the teeth catching the roller, and allow the dredge to be hauled on board the vessel.

The dredge can be constructed in this manner at a less cost than by the method now in use. It is much more durable and less liable to get out of order, for the reason, in the first place, that the lower rods, being the main part of the dredge, do not require the complication of an attachment, as in the old method. Another advantage of the improvement is that said rods act with more force at the end of the ears or levers $o\,o$, than when attached at the upper edge of the head, where the leverage of the teeth is against them; and in the third place the two extra screw-bolts and nuts in the rake-head equalize the strain when the dredge is in action on the oyster-rack, and prevent the loosening of the nuts, in consequence of the irregular, jerking action which takes place as the vessel drags the dredge along the uneven surface of the bed of the river or bay in which it is used.

Having thus described my invention, what I claim as new, and desire to secure by Letters Patent, is—

The combination of the two bolts $m$ and $n$, with the lug $o$, the rods A and B, and the head C, when all said parts are combined and arranged so as to operate together, substantially in the manner and for the purposes set forth.

C. T. BELBIN.

Witnesses:
  HENRY WINER,
  J. F. ENOMS.